United States Patent [19]

DelGrande

[11] 4,172,547
[45] Oct. 30, 1979

[54] METHOD FOR SOLDERING CONVENTIONALLY UNSOLDERABLE SURFACES

[76] Inventor: Donald J. DelGrande, 3526 N. Mascher St., Philadelphia, Pa. 19140

[21] Appl. No.: 957,028

[22] Filed: Nov. 2, 1978

[51] Int. Cl.² .............................................. B23K 1/20
[52] U.S. Cl. .................................... 228/121; 228/124; 228/175; 427/205; 156/276
[58] Field of Search ............... 427/205, 127, 328; 156/276; 228/121, 122, 124, 175; 29/625

[56] References Cited

U.S. PATENT DOCUMENTS

| | | | |
|---|---|---|---|
| 2,722,496 | 11/1955 | Hosmer | 228/124 |
| 2,798,577 | 7/1957 | Forge | 156/276 X |
| 2,848,802 | 8/1958 | Luks | 228/121 |
| 2,897,409 | 7/1959 | Gitto | 29/625 X |
| 2,991,213 | 7/1961 | Williams | 156/304 |
| 3,031,344 | 4/1962 | Sher et al. | 29/625 X |
| 3,060,062 | 10/1962 | Katz et al. | 427/96 |
| 3,132,204 | 5/1964 | Giellerup | 156/275 X |
| 3,146,125 | 8/1964 | Schneble et al. | 427/98 X |
| 3,283,401 | 11/1966 | Pijls | 228/175 |
| 3,391,455 | 7/1958 | Hirohata et al. | 427/205 X |
| 3,506,482 | 4/1970 | Hirohata et al. | 427/205 X |
| 3,676,920 | 7/1972 | Pilditch | 228/120 |
| 3,916,042 | 10/1972 | Grietens | 427/284 X |
| 4,033,668 | 7/1977 | Presby | 228/121 X |

FOREIGN PATENT DOCUMENTS 1962912  6/1971  Fed. Rep. of Germany ...... 427/284 X

*Primary Examiner*—Francis S. Husar
*Assistant Examiner*—Kenneth J. Ramsey
*Attorney, Agent, or Firm*—Steele, Gould & Fried

[57] ABSTRACT

A method for joining conventionally unsolderable surfaces, comprising the steps of coating the surfaces with an adhesive, coating the adhesive with solderable metallic particles while the adhesive is tacky, and, after the adhesive is cured, soldering said surfaces together, the solder adhering to the metallic particles and forming a bond between the surfaces. The adhesive is preferably a high-temperature resistant adhesive. The solderable metallic particles are preferably a combination of granules and powder preferably of copper. The conventionally unsolderable surfaces include, but are not limited to, glass, porcelain, conventionally unsolderable metals such as steel, wood and paper products.

10 Claims, 5 Drawing Figures

METHOD FOR SOLDERING CONVENTIONALLY UNSOLDERABLE SURFACES

BACKGROUND OF THE INVENTION

1. Field of the Invention

This invention relates generally to the field of construction utilizing solder as an attachment means, and in particular, to a method for soldering conventionally unsolderable surfaces to other conventionally unsolderable surfaces or conventionally solderable surfaces.

2. Prior Art

The problem of soldering conventionally unsolderable surfaces has also been characterized as the difficulty of creating a tinnable surface, that is, a surface to which solder will adhere. Various approaches to this problem are demonstrated in three areas: the formation of circuit boards, the splicing of fiber optical rods and decorative stained glass construction.

With regard to printed circuit boards, a method is known which comprises printing a curable adhesive ink in a predetermined pattern on an insulating base, applying a metal powder onto the printed insulating base whereby discrete particles of the metal powder are retained on the printed adhesive ink only, and curing the adhesive ink so as to fix the discrete particles of metal powder thereon. The remaining steps involve immersing the insulating base in an aqueous solution of stannous chloride and palladium chloride for producing an activating agent thereon, and subsequently treating the base with an electroless metal deposition bath. In another method, a printed circuit board is constructed by applying an adhesive to the surface of an organic resin plate in an electrical circuit pattern, scattering metal powders on the adhesive, pressing the scattered metal powders, so that the metal powders are partly imbedded in and partly exposed to the surface of the adhesive, curing the adhesive combined with the metal powders and depositing a conductive metal coating on the exposed metal powders by electroless plating whereby the exposed metal powders act as a catalyzer. Both of these methods require the step of electroless plating prior to soldering, whereas the subject invention requires no such step. Further, although it is noted that the resultant electrical circuit path is strong enough to stand up to soldering, there is no indication that such a bond would be strong enough to hold structural members together.

With regard to splicing fiber optical rods, it is known to coat the peripheral surface of the glass members to be joined with a thin adhering metallic layer. The coated glass members are properly positioned adjacent one another and solder is flowed around the joint between the members. While such a joint is strong enough to maintain the fiber optical rods in an aligned joint, there is no teaching that such a joint would or could be strong enough for joining structural members. In particular, the metallic layer is formed from a glass adhering paste designated "Bright Platinum, 0.5X, Paste". Such a metallic paste is very, very expensive, and therefore wholly unsuitable for a large scale application. The method of this invention, which provides a joint strong enough to join structural members, may be practiced with nearly any high temperature resistant adhesive and relatively inexpensive solderable metallic particles, such as copper.

In the area of decorative stained glass, a tinnable surface is provided by edging each piece of glass with a thin strip of metal foil, which is soldered into a continuous metal perimeter. Such a joint is significantly weaker than that formed by the method taught in this invention, and is much more costly and time consuming. Further, a metal foil joint must be caulked in order to weatherproof or waterproof the joint, whereas a joint made in accordance with this invention is inherently weatherproof and waterproof.

All of the disadvantages of the prior art methods for soldering to conventionally unsolderable surfaces are overcome by this invention, whereby any conventionally unsolderable surfaces may be joined by coating the surfaces with an adhesive, coating the adhesive with solderable metallic particles while the adhesive is tacky, and, after the adhesive is cured, soldering the surfaces together, the solder adhering to the metallic particles and forming a bond between the surfaces. The adhesive is preferably a high temperature resistant adhesive. The solderable metallic particles are preferably a combination of granules and powder, preferably copper. By the method of this invention, it is possible to solder to virtually any conventionally unsolderable surface, including glass, porcelain, wood, unsolderable metals such as steel and paper products. The method is also effective for joining a solderable surface or material to a conventionally unsolderable surface or material.

SUMMARY OF THE INVENTION

It is an object of this invention to provide a method for joining conventionally unsolderable surfaces.

It is another object of this invention to provide a method for soldering conventionally unsolderable surfaces.

It is a further object of this invention to provide a method for joining conventionally unsolderable surfaces with a joint that is inherently weatherproof and waterproof.

It is a still further object of this invention to provide a method for joining a conventionally unsolderable surface to a conventionally solderable surface.

It is yet another object of this invention to provide a method for soldering a conventionally unsolderable surface to a conventionally solderable surface.

It is a still further object of this invention to provide a method for joining any combination of conventionally solderable or conventionally unsolderable materials into a substantially self-supporting structure.

These and other objects are accomplished by a method for joining conventionally unsolderable surfaces, comprising the steps of coating the surfaces with an adhesive, coating the adhesive with solderable metallic particles while the adhesive is tacky, and, after the adhesive is cured, soldering the surfaces together, the solder adhering to the metallic particles and forming a bond between the surfaces. The method is also suitable for joining a conventionally solderable surface or material to a conventionally unsolderable surface or material, or any combination thereof. The adhesive is a high temperature resistant adhesive in order to withstand the temperatures of an ordinary soldering iron or soldering gun. The solderable metallic particles are preferably a combination of granules and powder, preferably of copper. The conventionally unsolderable surfaces with which the method of this invention is effective includes, but is not limited to glass, porcelain, wood, unsolderable metals such as steel and paper products.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
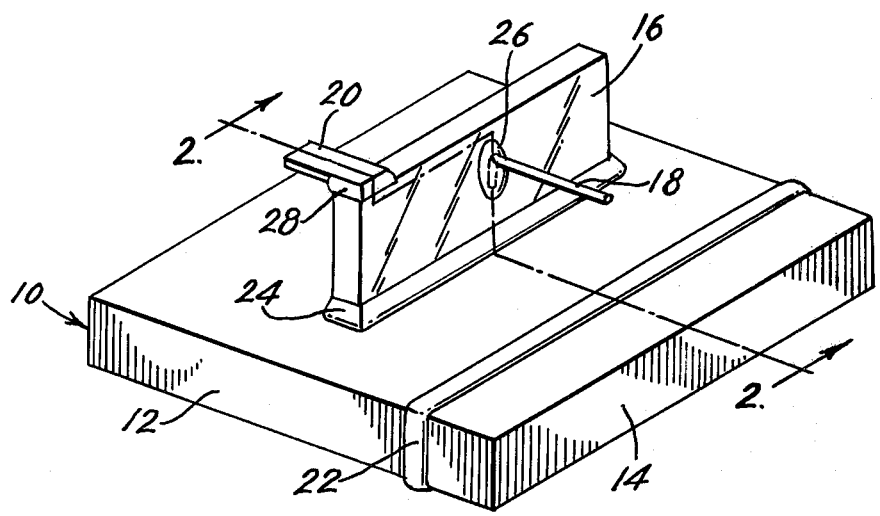
FIG. 1 is a perspective view of an arbitrary structure comprising various conventionally solderable and conventionally unsolderable materials constructed in accordance with the methods of this invention.
Figure 2:
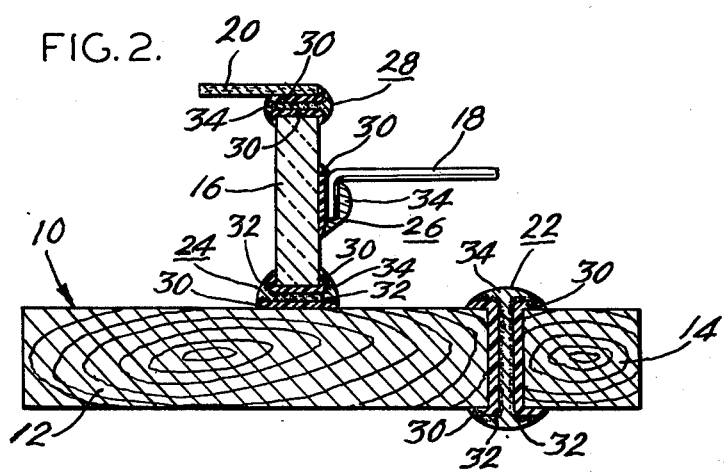
FIG. 2 is a sectional view taken along the line 2—2 in FIG. 1.

A representative structure 10 comprising a variety of conventionally solderable and conventionally unsolderable materials constructed in accordance with the methods of this invention is shown in FIG. 1. The structure comprises wood members 12 and 14, glass member 16, metal wire 18, and cardboard member 20. Wood members 12 and 14, glass member 16 and cardboard member 20 represent conventionally unsolderable materials, and metal wire 18 represents a conventionally solderable material.

The various members of structure 10 are connected by a number of soldered joints formed in accordance with this invention. Joint 22 represents a wood-wood bond, joint 24 represents a wood-glass bond, joint 26 represents a glass-solderable metal bond and joint 28 represents a glass-paper bond. Each of these bonds or joints is formed in substantially the same fashion, as sequentially illustrated in FIGS. 3-5.

Figure 3:
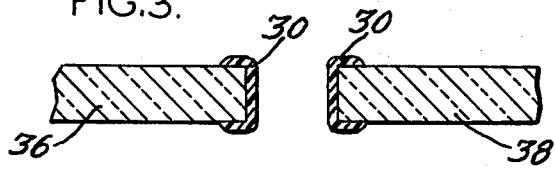
FIGS. 3, 4 and 5 sequentially illustrate the method of this invention as practiced in joining pieces of glass shown in section view.
Figure 4:
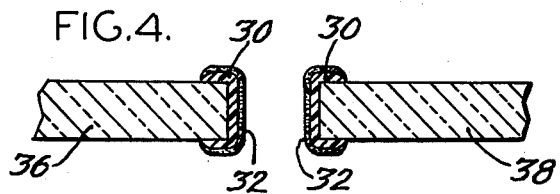
Figure 5:
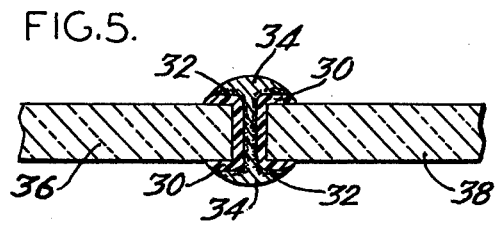

With reference to FIGS. 3-5, the method of this invention for joining conventionally unsolderable surfaces is illustrated with respect to an edge-to-edge joint of two pieces of glass 36 and 38. The first step, as shown in FIG. 3, is the application of an adhesive layer 30 to each edge of glass which is to be joined. The glue or adhesive 30 should be a high temperature resistant adhesive, because it must withstand the normal operating temperatures of a typical soldering iron or soldering gun. Two suitable adhesives are Dow Corning 734 RTV Selastic, a silicon base adhesive and Pecora firebrick cement, generally comprising firebrick clay and asbestos fiber. The adhesive or glue 30 preferably covers or substantially covers all of the mutual edges to be joined. If this method is applied to the construction of decorative stained glass, it would also be desirable to apply a narrow strip of adhesive on each surface bordering each edge to be joined. This overlap is the basis for the neat appearance of the solder bead in the finished product illustrated in FIG. 5. The adhesive 30 may be applied with a foam-covered roller or a brush, the bristles of which have been cut and notched according to the thickness of the glass or material to be joined. Of course, other methods of application are available, such as dipping the article to be joined into a vat of adhesive.

The second step, illustrated in FIG. 4, must be performed while the adhesive or glue 30 is still tacky, that is, before it has cured. In the second step, a coating of metallic solderable particles 32 is applied to the adhesive layers 30. Suitable solderable metallic particles include copper, silver and gold. In size, the particles are preferably a combination of granules and powder, although either alone is still effective. A suitable solderable metallic particle is Alcan metal powder MD No. 41, which is copper. The metallic particles 32 may be applied by sprinkling them over the adhesive layers, or the adhesive layers may be dipped or pressed into trays containing the metallic particles. In either event, a substantially uniform coating is desirable, although not absolutely necessary.

The third and final step, illustrated in FIG. 5, takes place after the adhesive has cured, thereby bonding the metallic particles to the pieces of glass or other material. The edges to be joined are placed in abutting relationship, and may be soldered together using standard solder, such as a lead-tin composition, and standard soldering irons or soldering guns. The result is a neat solder bead 34 which completely seals the joint. This joint is weatherproof and waterproof.

As illustrated by the structure 10, the method described herein is suitable for joining virtually any conventionally unsolderable material to any other conventionally unsolderable material or conventionally solderable material. Such conventionally unsolderable materials include, but are not limited to, glass, porcelain, wood, unsolderable metals such as steel and paper products. Even for paper products, a suitable high temperature resistant adhesive will protect the paper product from being burned during the soldering process.

The potential applications of this invention to various fields are innumerable. The method is useful in electronics, glass and stained glass construction and a variety of artistic endeavors, just to name a few. The method of this invention is relatively inexpensive, labor-savings and reliable. Products produced in accordance with this invention particularly lend themselves to being repaired. Joints made in accordance with this invention may be desoldered and resoldered, simplifying the replacement or rearrangement of any element in the structure. The repaired joint will be as strong, weatherproof and waterproof as the original joint.

The present invention may be embodied in other specific forms without departing from the spirit or essential attributes thereof, and accordingly, reference should be made to the appended claims, rather than to the foregoing specification as indicating the scope of the invention.

I claim:

1. A method for joining conventionally unsolderable surfaces; comprising the steps of:
   coating said surfaces with an adhesive;
   coating said adhesive with solderable metallic particles while said adhesive is tacky; and, after said adhesive is cured,
   soldering said surfaces together, said solder adhering to the metallic particles and forming a bond between said surfaces.

2. The method of claim 1, wherein said adhesive is a high temperature resistant adhesive.

3. The method of claim 1, wherein said conventionally unsolderable surfaces include glass, wood, steel and paper products.

4. A method for joining a solderable surface to a conventionally unsolderable surface, comprising the steps of:
   coating said conventionally unsolderable surface with an adhesive;

coating said adhesive with solderable metallic particles while said adhesive is tacky; and, after said adhesive is cured, soldering said surfaces together, said solder adhering to said solderable surface and said metallic particles, forming a bond between said surfaces.

5. The method of claim 4, wherein said adhesive is a high temperature resistant adhesive.

6. The method of claim 4, wherein said conventionally unsolderable surfaces include glass, wood, steel and paper products.

7. The method of claim 1 or 4, wherein said solderable metallic particles are a combination of granules and powder.

8. The method of claim 1 or 4, wherein said metallic particles are copper.

9. The method of claim 1 or 4, wherein said adhesive is a silicon based adhesive.

10. The method of claim 1 or 4, wherein said adhesive is a firebrick cement.

* * * * *